United States Patent [19]

Imbert et al.

[11] 4,275,302

[45] Jun. 23, 1981

[54] METHOD AND DEVICE FOR CONVERTING THERMAL IMAGES INTO SECONDARY IMAGES, E. G. VISIBLE IMAGES

[75] Inventors: Christian Imbert, Ballancourt; Yves Levy, Malakoff; Jean-Claude Loulergue, Paris, all of France

[73] Assignee: Agence Nationale de Valorisation de la Recherche (ANVAR), Neuilly sur Seine, France

[21] Appl. No.: 78,559

[22] Filed: Sep. 24, 1979

[30] Foreign Application Priority Data

Sep. 29, 1978 [FR] France .............................. 78 28041

[51] Int. Cl.³ ........................ H01J 31/50; G02F 1/29
[52] U.S. Cl. .................................... 250/330; 350/361
[58] Field of Search .................... 250/330, 472, 316.1, 250/474; 350/361

[56] References Cited

U.S. PATENT DOCUMENTS 3,397,313  8/1968  Mast ..................................... 250/330
3,603,794  9/1970  Mast ..................................... 250/330

*Primary Examiner*—Alfred E. Smith
*Assistant Examiner*—Carolyn E. Fields

[57] ABSTRACT

A converter and method of converting thermal images into secondary images, e.g. visible images. The infrared radiation emitted by an object is focused by an optical system to form a thermal image on the free surface of a thermal radiation absorbing layer to one side of a liquid-liquid interface which has low surface tension and is a mixture of two liquid partially miscible at operating temperature and pressure. To convert the thermal image to a visible a parallel beam of light or a beam of light from a point source in the visible range is directed to the other side of the interface and, depending on the selected indices of the interface liquids and whether a prism is used or not; is either transmitted or reflected. The emerging transmitted or reflected beam is then received on a screen or in a detection system where variations of the optical properties of the emerging beam are observed.

31 Claims, 10 Drawing Figures

METHOD AND DEVICE FOR CONVERTING THERMAL IMAGES INTO SECONDARY IMAGES, E. G. VISIBLE IMAGES

FIELD OF THE INVENTION

The present invention relates to a method for converting thermal images, namely infrared images, into visible images, and a device for carrying out the method.

BACKGROUND OF THE INVENTION

It is well known that any body whose temperature is greater than absolute zero emits radiation in the infrared range the spectral intensity of which depends on the nature of the emitting surface and the absolute temperature of the body. In many military, medical and industrial uses it is desirable to convert infrared radiation into visible light in order to observe bodies and measure their surface temperatures.

There are systems in which the infrared radiation is converted into visible light by means of image amplifiers. However, these systems only use a small part of the infrared spectrum, i.e. near visible light, in the range between 0.8 μm and 1.4 μm. As for bodies at ambient temperature the greater part of their emitted infrared energy is lost since it is located near 10 μm and cannot be utilized in this manner.

Other systems employ the near and remote infrared spectrum between 1 μm and 100 μm, for example, motion-picture camera with a thermocouple, holometer or pyroelectric type thermal detecters. These instruments require about one minute to provide an image. They are therefore incapable of monitoring moving bodies.

There are instruments which monitor moving bodies at a speed close to the standards of conventional television. To achieve such results quantic receivers are employed which must be cooled with liquid helium or liquid oxygen which is a considerable constraint.

In another system which requires about 5–6 seconds to produce a visible image, a liquid is used which is locally condensed or evaporated in greater or lesser amounts depending on the intensity of incident infrared radiation. However, apart from the fact that it needs several seconds to produce an image, which is still too long to observe moving bodies, the system must be reset to observe another image which is at least a one-minute operation even in the hands of an experienced technician.

To enable the monitoring of moving bodies or events in the infrared range, there are some devices which employ a sensitive layer which vary locally in accordance with the radiation intensity. Such local variations are usually deformations of the surface of the sensitive layer. The resulting relief image is used to control a visible light which after being reflected or transmitted by the deformed surface passes through a viewing system, e.g. a Schlieren, phase contrast or holographic system.

The difficulty with such systems lies in the choice of a suitable sensitive layer. Such layers are often of low sensitivity, and/or difficult technically to produce. For example, the part of the fine solid membrane heated by the infrared radiation expands; the neighbouring regions which are not heated or differently heated oppose the expansion of the contour of the first part thereby producing a two-dimensional warping.

It has also been proposed (see French patent No. 1,452,665) an image converter in which the control layer is a thin film of a low viscosity liquid, e.g. a hydrocarbon. The sensitive layer then comprises a thin liquid film which absorbs radiation and heats up locally. There results a variation in density and convection motion is established which may be observed if the liquid contains fine particles in suspension. Under the same conditions the free surface of the liquid deforms and produces an infrared relief image located in the liquid. Finally, a sensitive layer may be formed as a semi-conductor. In this case it is not the surface which deforms but the refractive index which changes in accordance with the infrared radiation. This procedure is not very sensitive, like all those based on the thermal variations of an optical parameter of a pure body.

By way of example of a reference illustrating the prior art French patent No. 71 08 811 (publication No. 2,081,937) may be cited, which discloses an image converter in which the liquid film, which is locally deformable as a function of the intensity of the infrared radiation, is supported by a freely deformable thin membrane.

The drawback common to all image converters utilizing a sensitive layer is that the latter must be permanently regenerated when the converter is being used. It is then necessary to provide, in addition, windshield wiper type devices which spread the layer on its support. The construction and use of such converters therefore necessarily pose technical problems. The support for the sensitive layer is not sufficiently strong to support the "windshield wiper" device. Moreover, the dimensions of the layer is perforce limited by imperatives of construction and renewal of the sensitive layer.

French patent No. 72 14 212 is concerned with a method comprising converting thermal images, particularly for viewing an object emitting thermal radiation, viz. infrared radiation, by forming a thermal image, namely that of the object, on a face of an interface which is covered with at least one layer of thermal radiation absorbing material, the distribution of the temperatures in the thermal image resulting in a variation of physical parameters of the layer.

The other face of the interface, which is reflective, is illuminated with a beam of parallel light rays the optical properties of which undergo during the reflection of the interface a corresponding variation of its optical properties. In the viewing plane a viewable secondary image exhibits the last named variation. The method according to the aforesaid French patent makes use of the index gradient and variation of the thickness of the layer of thermal radiation absorbing material.

To practice such a method the reflection of the beam of parallel light rays is effected on a plane solid-solid or solid-liquid interface. The interface is for example defined by the hypotenuse face of a prism on which is deposited a solid layer such as a methacrylic ester.

SUMMARY OF THE INVENTION

An object of the present invention is to provide a method and device of the foregoing type which eliminates the above mentioned drawbacks.

An essential object of the invention is the provision of an image converter of high sensitivity, owing to the fact that the reflection or transmission of the radiation occurs at the liquid-liquid interface.

Another object of the invention is to provide an image converter having no mechanical means associated with the sensitive layer, the thin film being formed by a simple mixture of two liquids.

Still another object is an image converter in which the dimensions of the sensitive layer may be selected as large as desired, thereby permitting, in particular, monitoring bodies of great dimension.

According to the present invention there is therefore provided a method for converting thermal images, particularly with a view to viewing an object emitting electromagnetic radiation, viz. infrared radiation, in which a thermal image is formed, namely that of the object, to one side of a plane interface which is covered with at least one layer of electromagnetic radiation absorbing liquid material. The distribution of the temperatures in the thermal image then results in a variation of physical parameters of the layer. The other side of the interface which is reflective or transmissive, is illuminated by a beam of parallel light rays the optical properties of which undergo a corresponding variation during the reflecting or transmission by the plane interface. A viewable secondary image is formed in a viewing plane which exhibits the last-named variation. The method is characterized by the reflection or transmission of the beam of parallel light rays on a plane interface which is a low surface tension liquid-liquid interface obtained by mixing two partially miscible liquids at operating temperature and pressure.

The method according to the invention makes use of local deformation of the liquid-liquid interface depending on the intensity of the electromagnetic radiation, viz. infrared radiation, due to the formation of a thermal image on the interface. Indeed, the heating of the liquid-liquid system by absorption of the infrared radiation thus leading to the formation of a thermal image, creates the horizontal and vertical temperature gradients which deform the plane liquid-liquid interface. Hence a relief image is obtained. The deformation thus induced by the infrared beam focused on the surface yields an interface which acts as a spherical mirror relative to the beam of parallel light rays. The beam so modulated due to the deformation of the interface, is reflected or transmitted onto a viewing plane defined by screen or detection system which depending on the case may employ Schlieren, Schlierenintereferential, phase contrast or holographic methods.

Because a deformable medium has a spatial frequency response of the band pass type, preferably a reflective grating with the thermal image is interposed thereby permitting the optimization of the response of the system of low frequencies. When the system is uniformly thermally radiated the function of the reflective grating is to create in any event temperature gradients in the electromagnetic radiation absorbing layer, therefore to detect a zero spatial frequency (the background).

The reflective grating, preferably metal, is placed in the vicinity of the free surface of the electromagnetic radiation absorbing solution. In another embodiment it is possible to place the reflective grating at the level of the liquid-liquid interface.

In a more advantageous embodiment the reflective grating is replaced with the image of a diffraction grating formed on the surface of the electromagnetic radiation absorbing solution. The infrared radiation and the image of the aforesaid diffraction grating are therefore projected simultaneously on the surface. The advantage of this method is that all the infrared radiation reaches the sensitive layer already spatially modulated, the energy used for forming the image of the grating being of much greater intensity than that of the IR radiation to be detected. The sensitivity can thus be augmented by a factor of two with respect to the aforesaid metal grating.

In a particularly preferred form of the method according to the invention the beam of parallel light rays or beam from a point source emanates from a source emitting visible light thereby permitting the conversion of the infrared image into a visible image.

According to another aspect of the invention there is provided a device for carrying out the method. The device comprises a thermal image converter comprising illuminating means providing a beam of parallel light rays or a beam emanating from a point source, a plane interface reflecting or transmitting the beam, an optical system particularly adapted for infrared radiation, and a viewing system. The interface is coated whith at least one layer of radiation absorbing liquid material on which the optical system forms a thermal image of an object emitting electromagnetic radiation. The distribution of the temperatures in the thermal image results in a variation of physical parameters of the layer. The reflected or transmitted beam then undergoes a corresponding variation of its optical properties, which variation is exhibited by the viewing system. the converter is characterized by plane interface comprising a low surface tension liquid-liquid interface obtained by mixing two liquids which are partially miscible at the temperature and pressure of used.

As aforementioned it is desirable to incorporate into the converter according to the invention a reflective grating located in the vicinity of the free surface of the thermal radiation absorbing surface or a diffraction grating the image of which is formed in the vicinity of the free surface.

A reflective grating, for example, of metal, is comprised of metal bars spaced from one another a distance equal to the width of the bars, the inter-bar spacing x of the grating being selected so that the ratio x/d is between 10 and 20 (d being the thickness of the layer of thermal radiation absorbing liquid).

In the event a diffraction grating is used the spacing between adjacent slits is equal to that of the aforesaid metal grating. The image of the diffraction grating on the free surface of the electromagnetic radiation absorbing liquid is conventionally formed with the aid of a lens and a semi-transparent glass plate disposed above the free surface.

In the description which follows the target designates the unit comprised of the liquids forming a liquid-liquid interface, it being understood it is in no way limited to a two-phase system and that the present invention may be practiced with a three-phase system.

In another particularly advantageous embodiment of the converter according to the invention a blocked target obtained in the following manner is employed.

A two-phase liquid system separated by a sharp, optically plane liquid-liquid interface is produced and the target is blocked by arranging a glass plate transparent to infrared radiation on the free surface of the thermal radiation absorbing liquid; a very sensitive and convenient to use target is thereby available owing to the fact that the target is blocked by a plate.

According to another very advantageous embodiment it is possible to use a three-phase target, that is, the reflecting or transmitting interface is covered with two layers of liquid material. The three-phased unit is then covered as above with an IR transparent plate to provide a blocked target of more convenient use.

The essential feature of the invention is the combination of two partially miscible liquids I and II producing an optically plane, low surface tension liquid-liquid interface.

To obtain this liquid-liquid interface one proceeds in the following manner: two liquids I and II are mixed which have the basic property of being partially miscible at operating temperature and pressure. Under these conditions two mutually saturated solutions A and B are obtained which yield in mechanical equilibrium a sharp optically plane surface of separation called a liquid-liquid interface $I_{AB}$. When the converter according to the invention is used, the heating of the liquid-liquid system by absorption of the infrared radiation creates temperature gradients which deform the plane interface separating the two saturated solutions A and B depending on the intensity of the incident infrared radiation. The fact that the liquid-liquid interface has a low surface tension facilitates the deformation of the interface.

These two liquids I and II must be different as regards refractive index and density, and it is mandatory that they be of low viscosity. For instance, the liquid I has a viscosity between 0.5 and 100 centistokes at the operating temperature. The thermal image is formed in the saturated solution A (carried liquid) with a high concentration of liquid I.

Solution A has near-infrared absorbing properties, that is, in a spectral band between 1 and 100 microns. It is especially preferred that liquid I should absorb the infrared radiation in the 8–12 micron or 3–5 micron spectral band which are atmospheric ranges which correspond to the maximum emission of the bodies at ambient temperature.

Solution A is a thin film of low viscosity the thickness of which is between 5 and 300 microns, preferably between 5 and 200 microns, and more particularly between 5 and 100 microns. Solution A possesses a surface tension highly dependent upon the temperature. This is a necessary condition which contributes to the sensitivity of the device. The surface tension with the air is, for example, of the order of 0.02 dyne/cm °C. at 20° C. The mixture of partially miscible liquids I and II also presents another advantage: the surface tension of the interface which separates the two saturated solutions A and B may be of very low magnitude. The interfacial tension between the solutions A and B is, for example, of the order of 1 dyne/cm or less at ambient temperature. It becomes zero at the critical temperature of miscibility. Then the two-phase system disappears and a single liquid phase takes its place.

The last condition to be met to obtain a very sensitive device is that solution A have low thermal conductivity.

The invention provides an image converter of high sensitivity. The sensitivity is all the higher as the surface tension of the liquid-liquid interface is low. Indeed, it has been found that there is a direct relationship between the sensitivity and the surface tension. In practice an interface will be used having a surface tension less than 1 dyne/cm and preferably of the order of about 0.1 dyne/cm.

For liquid I are especially used substituted polysiloxanes, silicone oils, acetic acid, methanol, phenylacetic acid, butyric acid, diphenylamine, propionic acid, p-nitrochlorobenzene, acetic anhydride, acetonitrile, camphor, formic acid, cyclopentane, methylcyclopentane, cyclohexane, or methylcyclohexane, and for liquid II are used monobromonaphtalene, carbon tetrachloride, carbon sulfide, or methylene iodide.

The converter according to the invention can operate with total reflection as well as with transmission. When operating with total reflection a prism is provided under the two-liquid system, the refractive index of liquid II being greater than that of liquid I and equal or substantially equal to that of the prism. In this case, for good sensitivity, solution B has to be transparent to visible light.

When operating with transmission the only condition to be satisfied is the use of liquids I and II having very different indices.

The illuminating means of the converter according to the invention is not critical and comprises a monochromatic or polychromatic, coherent or incoherent source. Using a source of visible light then permits infrared images to be converted into visible images. The infrared optical system is a dioptric, catadioptric or catoptric lens system. The viewing system comprises a screen or a detection system employing schlieren, schlieren-interferential, phase contrast or holographic methods.

If a screen is used as the viewing system it may be arranged either in the vicinity of the liquid-liquid interface or when operating with total reflection, directly at the emergent face of the prism.

Another solution for detecting the deformation of the liquid-liquid interface consists in observing the colors associated with the deformation of the movable face of solution A when they change locally as a function of the intensity of infrared radiation striking solution A. As a variant it is also possible to make the deformation visible with normal incident, illumination.

According to a preferred embodiment there is provided a thermal image converter for viewing an object emitting infrared radiation, the converter comprising means for receiving infrared radiation emitted by the object being viewed, said means comprising an infrared radiation sensitive target, means for illuminating the infrared radiation sensitive target, means for processing and/or making visible the light rays emerging from the target, the converter being characterized in that the sensitive target comprises a first container containing two liquids partially miscible at operating temperature and pressure forming a low-surface-tension, active liquid-liquid interface, one side of the first container facing the object being transmissive of infrared radiation, a second container containing a compensating liquid-liquid interface which is substantially parallel to the active interface, whereby infrared radiation emitted by the object is focused on the less dense liquid in the first container, the means for illuminating providing a beam of parallel light rays illuminating the active interface, the angle of incidence of the rays on the active interface being chosen so as to provide substantially total reflection, rays reflected by the active interface then being reflected by the compensating interface and forming a beam of rays capable of being viewed in the means for processing and the parallel light beam illuminating the targent traversing it without any substantial change in direction irrespective of the spatial position of the converter.

In a preferred form of the foregoing embodiment the target essentially comprises two containers disposed on parallel faces of a glass rhombohedron, the first container with the active interface, a side of the first container remote from the rhombohedron and facing the object having a window transparent to infrared radiation, such as a germanium window, an inert gas such as nitrogen being contained in the free space in the first container between the liquid layer and the window, the second container essentially containing a mercury layer and a liquid whose refractive index is substantially identical with that of the glass of the rhombohedron, the last mentioned liquid being disposed between the layer of mercury and the adjacent face of the rhombohedron.

In an embodiment of this kind which comprises a rhombohedron interposed between the two containers of the target, the free faces of the rhombohedron are perpendicular to the central rays of the light beam illuminating the target. The angle of reflection of the light beam on the active interface is advantageously 60°.

Preferably the means for receiving the infrared radiation comprise, in the direction of the radiation, a lens system and a diaphragm, e.g., an iris diaphragm, for focusing the radiation on the less dense liquid contained in the first container of the target.

Preferably the means for illuminating the target comprise a collimator including a light source emitting visible light, a condenser, a diaphragm, and a lens system thereby providing a beam of parallel light rays.

Preferably the means for processing and viewing the light rays emerging from the target comprise an afocal system with two cylindrical lenses, a Porro prism, a ground glass plate, and a bi-ocular lens.

The converter according to the present invention admits of numerous applications, in military, medical and industrial fields. This device serves to render bodies visible by means of their heat radiation situated in the infrared spectrum and for measuring surface temperature gradients of the bodies.

The converter according to the invention is therefore used whenever remote temperature or radiancy distributions are to be observed.

Without attempting an exhaustive list of the possibilities of use the different fields in which the use of the converter is desirable we may cite by way of example: aeronautics and space, automobile, mechanics, metallurgy, electrolysis of metals, bonding, glass-making, paper-making, boilers and refrigeration, building, monitoring the production and distribution of electrical power, electronics, volcanology, botany, mapping ocean currents, etc.

An embodiment of the invention is described hereinafter, by way of example and in no way limiting, with reference to the accompanying drawings.

DETAILED DESCRIPTION OF THE PREFERRED EMBODIMENTS

Figure 1:
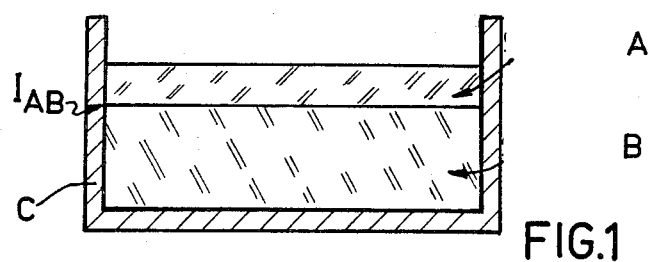
FIG. 1 represents the combination of two liquids permitting an optically plane liquid-liquid interface to be obtained.

FIG. 1 represents the equilibrium state resulting from the combination of two liquids I and II. Thus there is shown a two-component saturated solution B which is denser than solution A and therefore under it. The system is maintained in a container C. The concentration of one of the components I or II in each of solutions A and B only depends upon the temperature and pressure of the system. As a function of these parameters a saturated solution A may be obtained at a particular concentration and at the same time a thin liquid layer may be easily provided of uniform thickness adjustable as desired, on a liquid support without restrictions as to its spread. In addition the system is stable, i.e., when the saturated solutions are stirred they become mixed. Then the unmixing occurs quickly: under the force of gravity the solutions A and B separate to regain their starting equilibrium, that is to say, two liquid phases separated by a plane interface $I_{AB}$, each of the solutions A and B having the same concentration as initially.

The plane interface $I_{AB}$ forms a sharp, optically plane, surface of separation.

Figure 2:
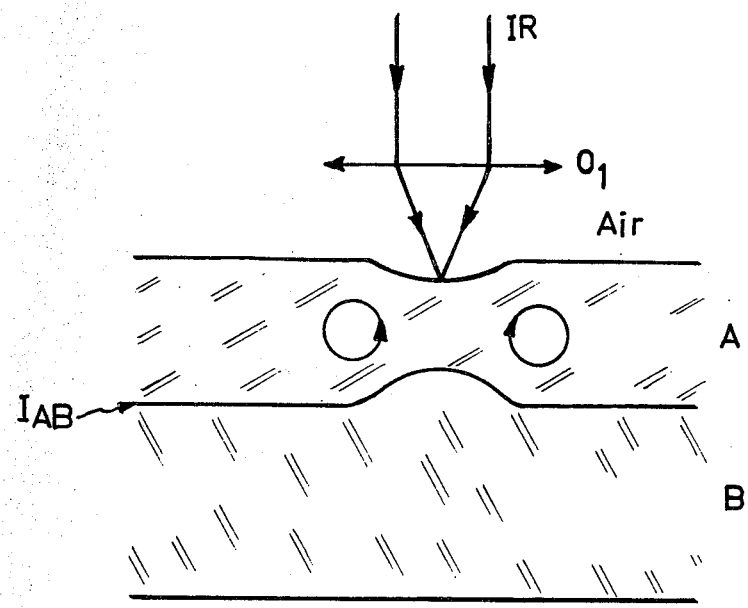
FIG. 2 represents the deformation of the interface in FIG. 1 under the action of infrared radiation.

When the two-phase system is radiated by localized infrared radiation emanating from an infrared source (not shown) and focused by an infrared optical system $0_1$ deformations as represented in FIG. 2 are obtained. The infrared radiation creates, by heating, horizontal tensions on the free surface of the solution A due to the thermal variation of the surface tension of this interface. A flowing of solution A is established to balance these tensions and creates a fluctuation of the normal pressure (hydrostatic+viscous) on the liquid-liquid interface $I_{AB}$, which deforms. Solution A, called the carried liquid, is a thin film of low viscosity. Film thicknesses between 5 and 200 microns have yielded the best results. As a particularly appropriate liquid I silicone oils having a viscosity between 0.5 and 100 centistrokes may be cited. This liquid I is mixed with an aromatic liquid II, as for example monobromonaphtalene.

Figure 3:
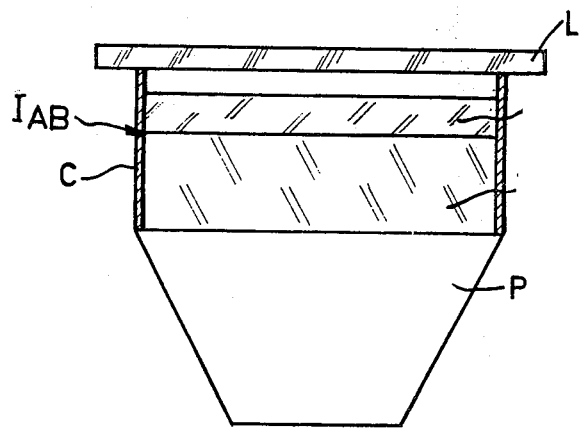
FIG. 3 represents the infrared receiver operating with total reflection in the converter embodying the invention.

FIG. 3 represents a detailed view of the infrared target with a solution B having an index greater than that of solution A, i.e., operating with total reflection. A previously saturated mixture of two liquids is deposited on one of the faces of prism P. The index of the prism is close to that of the carrier liquid, i.e. saturated solution B so that rays of infrared radiation encounter only a single interface, that is, liquid-liquid interface $I_{AB}$.

The container C containing the liquids and carried by one of the faces of the prism is covered by a glass plate transparent to infrared radiation thereby avoiding the evaporation of the liquids and their contamination.

Figure 4:
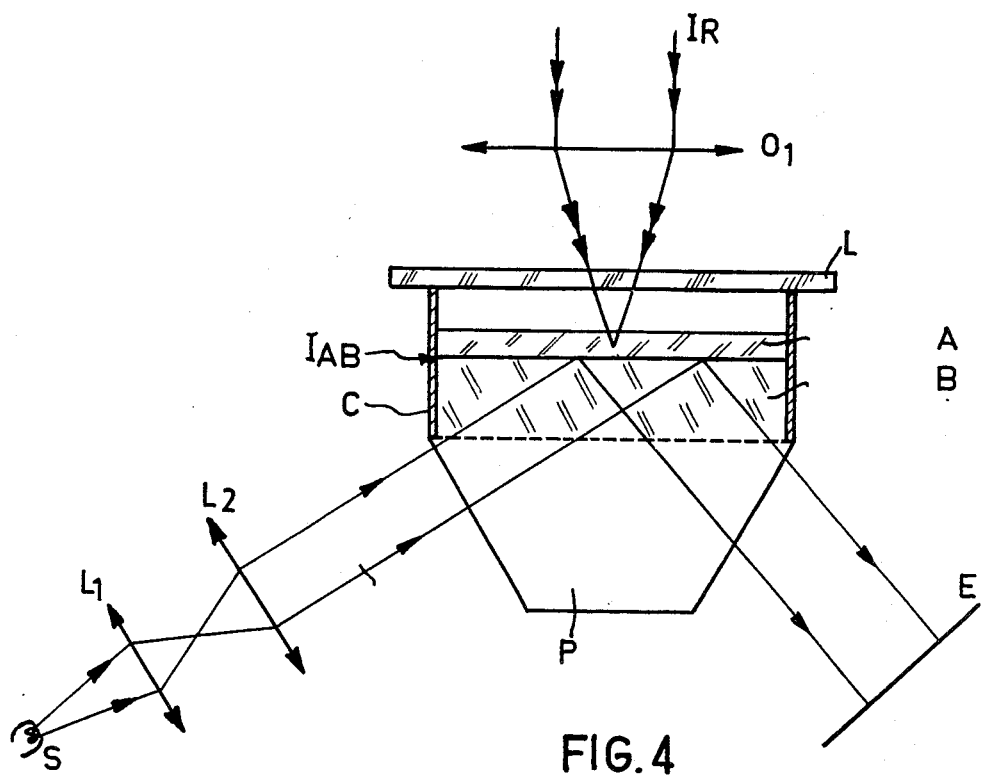
FIG. 4 represents the converter embodying the invention operating with total reflection.

FIG. 4 is an over-all view of the infrared image converter according to the invention operating with total reflection, that is to say, using the infrared target of FIG. 3. The converter comprises an infrared optical system $0_1$ which focuses the radiation to be converted, emanating from an infrared source, not shown, on the free surface of solution A. An infrared image is thus created on the free surface which is converted into a thermal image by the absorption of the infrared radiation thereby causing a deformation of the liquid-liquid interface $I_{AB}$. There is provided on the other side of the liquid-liquid interface $I_{AB}$ a mono- or polychromatic source S emitting a beam of light rendered parallel after traversing two lenses $L_1$ and $L_2$. The parallel beam of light is totally reflected by the deformed interface. The deformation of the interface is observed by the variation of the intensity of the reflected beam on a screen E placed immediately after prism P.

Figure 5:
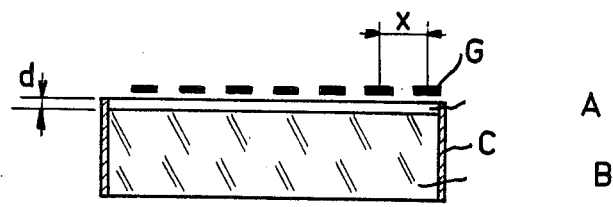

FIG. 5 represents another embodiment of the target. A two-component saturated solution A is provided in container C carried by a two-component solution B. These solutions result from a combination of two liquids I and II. A reflective grating G, for example of metal, is provided above solution A, the spacing x of the grating is such that the ratio x/d is between 10 and 20 (d being the thickness of the layer of solution A).

Instead of providing a reflective grating G above the solution A it is also possible to arrange it at the level of the interface between solution A and solution B (not shown). With this target it is possible to operate with transmission as well as total reflection.

If operating with total reflection a prism is arranged under solution B (as in FIG. 3).

Figure 6:
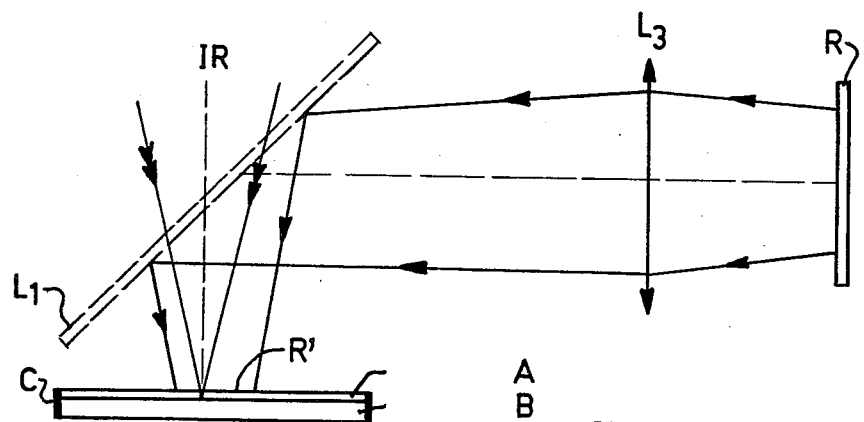

FIG. 6 represents a third embodiment of the target for use in the converter according to the invention. There is formed, with the aid of radiation absorbed by solution A, image R' of diffraction grating R with the aid of lens $L_3$ and glass plate $L_1$ transparent to infrared radiation and reflective for the radiation impinging R. The infrared radiation is projected simultaneously on the target.

The device permits the sensitivity to be doubled relative to that of the target of FIG. 5.

The diffraction grating spacing used is such that the ratio of the spacing of the grating to the thickness of the film of solution A ranges between 10 and 20.

Figure 7:
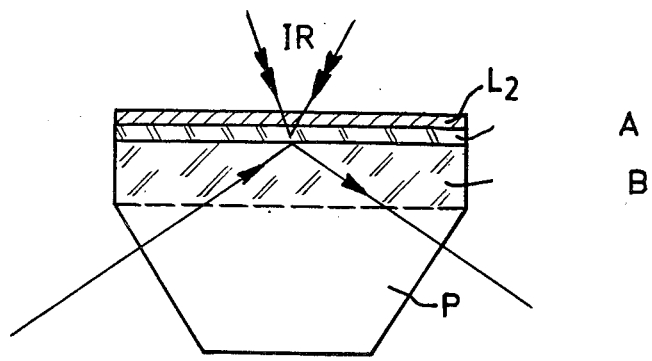

FIG. 7 represents a fourth embodiment of the target which operates with total reflection. A blocked target is constructed by depositing on the two-phase system, solution A solution B, an IR transparent glass plate L. Under the two-phase system is a prism the index of which is substantially equal to that of solution B.

Such a receiver may be used for transmission by eliminating the prism P.

Figure 8:
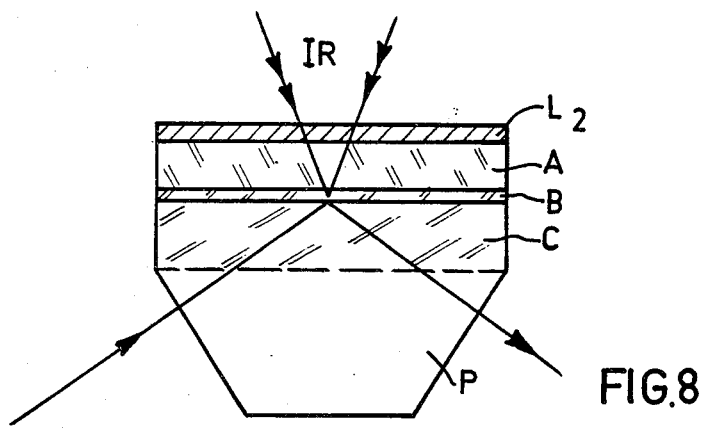
FIGS. 5–8 represent other embodiments of the target employing the converter embodying the invention and FIG. 9 represent the converter embodying the invention operating with normal transmission.

FIG. 8 represents a final embodiment of the target There is provided, as in FIG. 7, a glass plate L and a prism P but the liquid system is not a two-phase but a three-phase system. Three solutions A, B and C are present. Liquid B absorbs infrared radiation, on the other hand liquid A allows infrared radiation to pass therethrough. The interfacial tension between liquids B and C is very low and the thermal variation of the surface tension of the interface between liquids A and B is substantial. The thermal image is detected by the deviation of the rays reflected on the movable interface between B and C.

The interest of this system, as that of FIG. 7, is to have a blocked target of more convenient use.

This target may be used for transmission by eliminating prism P.

Figure 9:
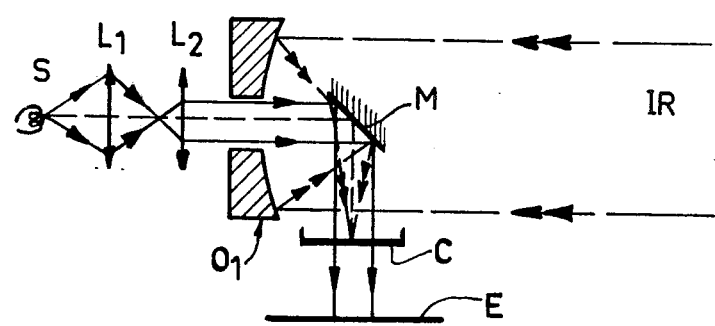

FIG. 9 represents the image converter according to the invention operating with normal transmission. This converter comprises an infrared optical system $0_1$ which focuses the radiation to be converted, emanating from an infrared source, not shown, on the free surface of solution A contained in container C. An infrared image is thus created on this free surface which is converted into a thermal image by absorption of infrared radiation thereby causing a deformation of the liquid-liquid interface. There is provided on the same side of the liquid-liquid interface as mono- or polychromatic source S emitting a beam of light rendered parallel after traversing two lenses $L_1$ and $L_2$. The parallel beam of light totally reflects on mirror M and traverses target designated C. The deformation of the interface by the variation of the intensity of the beam falling on a screen E placed just after the target, is viewed.

Figure 10:
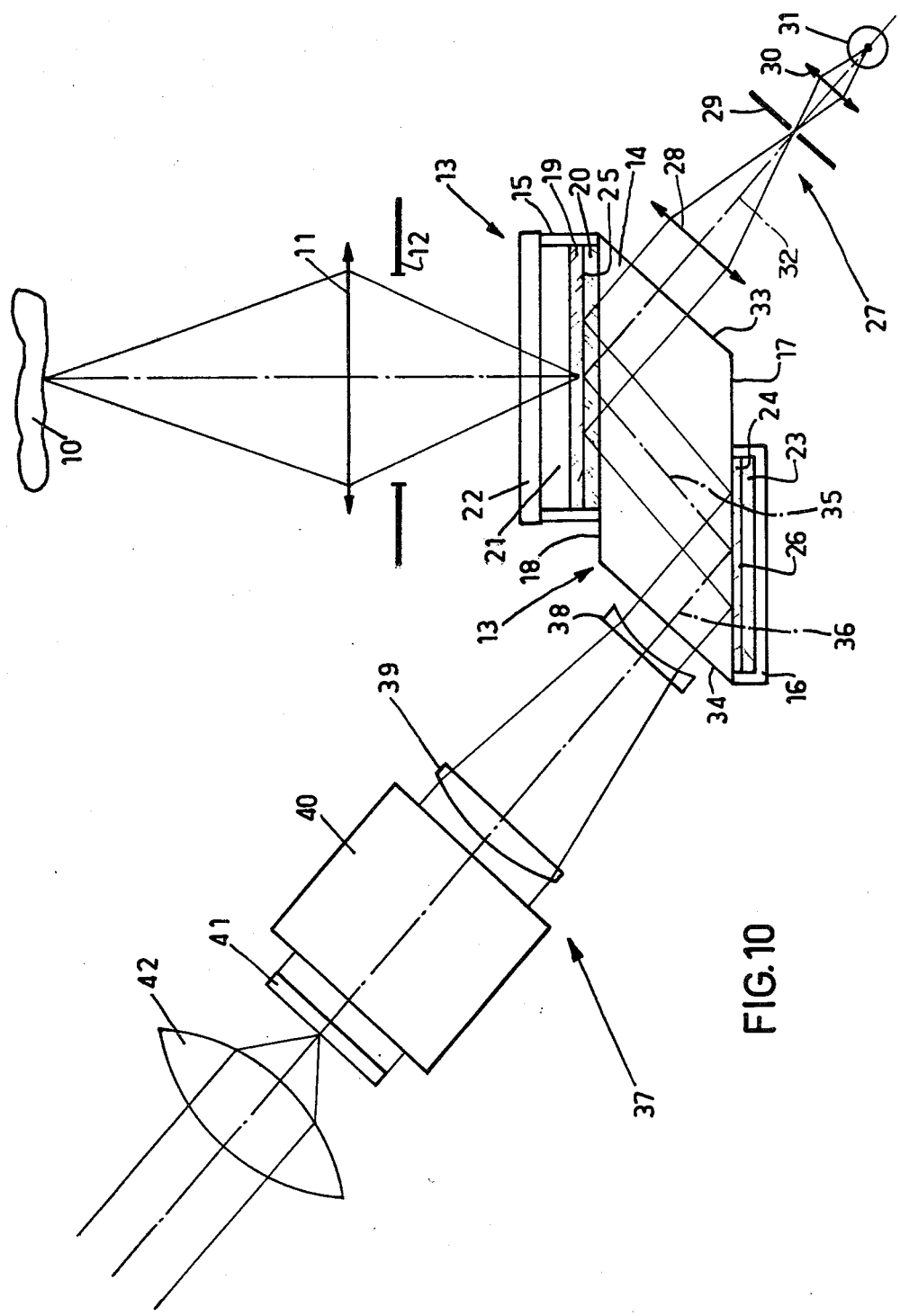
FIG. 10 diagrammatically represents a best mode of execution of the converter embodying the invention.

The preferred embodiment of the converter is diagrammatically illustrated in FIG. 10 of the drawings. This converter was realized by the French firm Société d'Optique, Précision, Electronique et Mécanique (Sopelem) 102, rue Chaptal, Levallois-Perret, France.

The infrared image converter diagrammatically represented in FIG. 10 as an easily transportable compact device for converting into visible images infrared radiation emitted by an object to be monitored.

The device comprises, first of all, means for receiving infrared radiation comprising, in the direction of the radiation, an infrared radiation lens system 11, a diaphragm 12 and a sensitive target or cell designated by general reference number 13.

The lens 11 is made of germanium and is designed for a wave-length of 10 μm. Its focal length is 75 mm, its aperture is f/2, its field of view is 25 mm. The diaphragm 12 is an iris diaphragm.

The target is made up of a glass rhomboherdron 14 and two containers 15 and 16 respectively bonded to two parallel faces 17 and 18 of the rhombohedron. Container 15 contains liquids 19 and 20 which, according to the invention, are partially miscible at operating temperature and pressure. An inert or inactive gas 21, such as dry nitrogen, is provided above the liquid 19. The wall 22 of the container 15 facing the lens 11 is transparent and formed as a germanium window. It goes without saying that the container comprises means (not shown) for making it gas-tight and liquid-tight. The thickness of liquid 19 is of the order of 100 μm and that of liquid 20 is of the order of 1 mm. Container 16 essentially contains a mercury layer or bath 23 separated from the adjacent face 17 of the rhombohedron 14 by a liquid 24 the index of refraction of which is identical with that of the glass of the rhombohedron. The liquids 19 and 20 together form an active interface 25, and liquids 23 and 24 form between each other an interface 26 called a compensating interface. The dimensions of interfaces 25 and 26 are of the order of 40 mm×40 mm, their operative areas being reduced to about 25 mm×25 mm.

The resolving power of the infrared lens 11 must not interfere with the quality of the image yielded by the interface 25. The interface 25 has a resolving power of five lines per millimeter over the entire field.

In the arrangement represented in FIG. 10 lens 11 is mounted vertically above interface 25. Of couse the focus of the lens 11 and the diameter of the aperture of diaphragm 12 may be adjusted. The lens may be focused between one meter and infinity. The aperture of the diaphragm is adjustable from f/2 to f/22. Such adjustments are performed in a manner well known to one having ordinary skill in the art by means of rings mounted on the lens system 11.

In a refined embodiment the lens system 11 may be surmounted by a mirror (not shown). The mirror is then pivotally mounted for displacement in elevation, e.g., between 35° and 55°. The mirror is fixed to the lens system and the lens system-mirror unit forms a module. The elevation control is effected by the support common to the lens system and the mirror.

The device further comprises a collimator designated by general reference 27. The collimator 27 comprises a lens 28, a diaphragm 29, a condenser 30 and a light source 31. The light source 31 comprises a mercury arc lamp, type HBO 50W/3, cooled by free flowing air. Diaphragm 29 has a circular aperture of diameter 50 $\mu$m positioned at the focal point of lens 28. The condenser 30, diameter 15 mm and focal distance 15 mm, is interposed between the light source 31 and diaphragm 29. An anticaloric filter (not shown) may be placed between the light source 31 and the condenser 30 as close as possible to the condenser. The lens 28 has a focal length of 105 mm and a relative aperture of f/4 ($\phi=25$ mm). The diffusion spot at the center of the field is 0.5 mrd. Its field is 5 mrd. It is corrected at infinity and treated for visible light.

The face 33 of the rhombohedron facing collimator 27 is perpendicular to central ray 32 emitted thereby. Face 33 is advantageously treated by a nonreflective coating for visible light.

The arrangement of the collimator 27 relative to the target 13 is such that the parallel visible light rays (represented by central ray 32) totally reflecting from active interface 25. The selected angle of reflection is equal to 60°. The beam 35 reflected by the interface 25 is then reflected into compensating interface 26. The reflected beam 36 passes perpendicularly through face 34 of the rhombohedron. Face 34 is also treated with a nonreflective coating for visible light.

The rays 36 emerging from the rhombohedron 14 is processed or viewed in an arrangement which will now be described. The arrangement of assembly, designated by general reference numeral 37 comprises viewing means. The assembly essentially includes anafocal lens system formed by two cylindrical lenses 38 and 39. The divergent lens 38, 10 diopters (f=100 mm), has an operative area of 13 mm×25 mm. The convergent lens 39, five diopters (f=200 mm) has a diameter of 25 mm. After convergent lens 39 in the direction of the rays 36 the viewing means comprises a Porro prism 40. The prism 40 is composed of four mirrors defining two perpendicular dihedral angles. The first dihedral is stationary and the second dihedral is movable along a short distance (e.g. 10 cm) parallel to the middle incident ray.

The beam of visible rays emerging from the Porro prism 40 is received on a screen 41. The screen comprises, for example, a ground glass plate on one side, the ground glass plate facing a bi-ocular lens 42. The biocular lens has a focal length of 80 mm, the screen being located at 75 mm from its main plane, thereby ultimately forming a virtual image at one meter from the screen.

The device diagrammatically represented in FIG. 10 and described hereinabove operates as follows. The infrared radiation emitted by the object 10 is focused in the lens system 10 to form an infrared image on the less dense liquid 19. The less dense liquid 19 is heated locally in accordance with the pattern of the image of the object 10. Since the surface tension between liquids 19 and 20 contained in the first container 15 varies with temperature, the interface 25 between liquids 19 and 20 deforms and in turn may act as an object.

The collimator 27 illuminates interface 25 with parallel visible light at an angle of incidence producing total reflection from interface 25 (angle of reflection equal to 60°). The beam reflected by the interface 25 traverses the rhombohedron 14, and is in turn reflected from the mercury layer 23 (compensating interface 26) contained in the second container 16. The beam carries a visible image corresponding to the deformation of interface 25. Still, direct viewing of the image is not possible because it is inverted and anamorphized. The reflected beam 36 is then processed by the afocal lens system (magnification 2X) including lenses 38 and 39, and by Porro prism 40 which erects the image. The image is formed on the ground glass plate 41 which is viewed through a bi-ocular lens 42.

Thanks to the device represented in FIG. 10 the free surface 23 of the mercury remains permanently parallel to active interface 25 thus having a compensation function. The parallel beam emerging from collimator 27 traverses the target 13 retaining on the average its initial direction. The unit made up by the collimator 27 and the viewing means 37 thus remains in a stationary position relative to the target 13. Such an arrangement provides compensation for changes of direction of orientation of the device and avoids optical adjustments after displacement even if the target is not maintained horizontally.

The rest of the description will be made with reference to examples of practical preparations of the combination of liquids I and II.

EXAMPLE I

Liquid I is a silicone oil (polydimethylsiloxane mixture) and liquid II is a monobromonaphtalene.

The physical properties of the pure liquids are indicated in the following table:

|  | Monobromonaphtalene | Silicone oil |
|---|---|---|
| Surface tension of pure liquid with air at 20° C. | 37.5 dyne/cm | 18.5 dyne/cm |
| specific gravity at 20° C. | 1.48 g/cm$^3$ | 0.9 g/cm$^3$ |
| refractive index for D line of sodium at 20° C. | 1.658 | 1.396 |
| kinematic viscosity at 20° C. | 3.56 × 10$^{-2}$ stoke | 2.83 × 10$^{-2}$ stoke |
| heat conductivity |  | 3 × 10$^{-4}$ W/cm. °C. |
| specific heat |  | 0.33 cal/g °C. |
| diffusivity |  | 10$^{-3}$ cm$^2$/sec. |

The physical properties of the system are as follows:

Surface tension of the monobromonaphtalene saturated with silicone oil with air:

21.5 dynes/cm at 20° C.

Surface tension of Silicone oil saturated with monobromonaphtalene with air:

19.6 dynes/cm at 20° C.

Surface tension of the surface of separation between the two mutually saturated solutions:

0.8 dyne/cm at 20° C.

Kinematic viscosity at 20° C. of the monobromonaphtalene saturated with oil:

3.55×10$^{-2}$ stoke

Kinematic viscosity at 20° C. of the oil saturated with monobromonaphtalene:

2.77×10$^{-2}$ stoke

The association of these two liquids is seen to permit a very low surface tension to be obtained, therefore susceptible of being deformed easily.

The expression $(i/\alpha AB)(d\alpha A/dT)$ may be used at the criterion of sensitivity of the converter according to the present invention, $\alpha_A$ designating the surface tension of saturated solution A with air, and $\alpha_{AB}$ designating the surface tension of the interface $I_{A-B}$.

Indeed dα/dT A represents the thermal effect which destabilizes the saturated solution A and generates convection currents.

That is the motor effect and (1/αAB) represents the mechanical effect of the aforesaid instability which acts on the liquid-liquid interface and deforms it.

That is the sought-after effect.

Assuming that the deformation of the liquid-liquid interface is slight relative to the thickness of the film of solution A which is so in practice, it is found that for a given sensitivity:

(1/αAB) (dO$_A$/dT)

the deflection of the interface is inversely proportional to the thickness of solution A. Moreover, the thickness of solution A may not be diminished indefinitely: the deformation of the interface must follow the variations in temperature of the solution A with a low time constant. The thickness of the saturated solution A therefore is a minimum which taking account the thermal sensitivity sought and the spatial resolution desired, must be suitably selected as a function of the parameters of the materials. In an actual construction a time constant of the order of 1/10 second was obtained with a thickness of the solution A of about 100 microns.

EXAMPLE II

This example concerns other usable liquids I and II and combinations of such liquids.

(1) Liquid II-monobromonaphtalene (n=1.66 d=1.48).
  Liquid I acetic acid—CTS 42° C.
  methanol—CTS 62° C.
  phenylacetic acid—CTS 55° C.
(2) Liquid II—carbon tetrachloride CCl$_4$ (n=1.46) (d=1.60)
  Liquid I acetic acid—CTS 25° C.
  butyric acid—CTS 25° C.
  diphenylamine—CTS 28° C.
  propionic acid—CTS 25° C.
  p-nitrochlorobenzene—CTS 50° C.
(3) Liquid II—carbon sulfide CS$_2$ (n=1.628) (d=1.30)
  Liquid I acetic anhydride—CTS 30° C.
  acetonitrile—CTS 51.5° C.
  butyric acid—CTS 25° C.
  camphor—CTS 25° C.
  formic acid—CTS 43° C.
  methanol—CTS 36° C.
  p-nitrochlorobenzene—CTS 50° C.
  propionic acid—CTS 25° C.
(4) Liquid II methylene iodide CH$_2$I$_2$ (n=1.742).

| Liquid I cyclopentane | CTS 30.5° C. |
| methylcyclopentane | CTS 44° C. |
| cyclohexane | CTS 31°0 C. |
| methylcyclohexane | CTS 45° C. |
| acetic acid | CTS 45° C. |

(CTS is the Critical Temperature of the Solution) (n is the refractive index for the D line of sodium at 20° C.) (d=density at 20° C.).

What we claim is:

1. In a method for converting thermal images into secondary images comprising the steps of: providing a plane optical interface having a layer of thermal radiation absorbing material on one face, the other face being reflective or transmissive, forming a thermal image on said one face resulting in a variation of the physical parameters of said layer, illuminating said other face with a beam of light which undergoes during reflection or transmission by said interface a corresponding variation of its optical properties, and forming in a viewing plane a viewable secondary image exhibiting said last named variation, the improvement comprising forming said interface as a liquid-liquid interface by mixing two liquids partially miscible at operating temperature and pressure.

2. The method according to claim 1, further comprising arranging in the vicinity of the free surface of said layer of thermal absorbing liquid a reflecting grating.

3. The method according to claim 1, further comprising forming in the vicinity of the free surface of said layer of thermal absorbing liquid an image of a diffraction grating.

4. The method according to claim 1, 2 or 3, wherein said beam emanates from a source of visible light whereby said secondary image is a visible image.

5. The method according to claim 1, wherein said thermal image is formed by electromagnetic radiation emanating from an object.

6. A thermal image converter for converting thermal radiation emitted by an object, comprising a plane optical interface, a layer of thermal radiation absorbing liquid disposed to one side of said interface, said interface being reflective or transmissive, an optical system for focusing thermal radiation emitted by the object and forming a thermal image on said layer, the temperature distribution of said thermal image resulting in a variation of physical parameters of said layer, means for illuminating the other side of said interface providing a beam of parallel light rays or a beam of light from a point source, viewing means being arranged to receive the beam reflected or transmitted by said interface which undergoes a corresponding variation to its optical properties, the improvement comprising said interface being a liquid-liquid interface having low surface tension formed by a mixture of two liquids, liquids I and II, which are partially miscible at operating temperature and pressure.

7. The converter according to claim 6, further comprising a reflecting grating located in the vicinity of the free surface of said layer of thermal radiation absorbing liquid.

8. The converter according to claim 6, further comprising a diffraction grating the image of which is formed in the vicinity of the free surface of said layer of thermal radiation absorbing liquid.

9. The converter according to claim 6, further comprising a glass plate transparent to infrared radiation being disposed in the vicinity of the free surface of said layer of thermal radiation absorbing liquid.

10. The converter according to claim 6, there being another layer liquid material disposed to said one side of said interface.

11. The converter according to claim 6, wherein said plane interface being defined by liquid-liquid interface I$_{AB}$ between two manually saturated solutions A and B obtained by mixture of two partially miscible liquids I and II, liquid I having a viscosity between 0.5 and 100 centistokes at the operating temperature, solution A having near-infrared absorbing properties, a low heat conductivity and a low interfacial tension with solution B in the order of 1 dyne/cm, a layer thickness between 5 and 300 microns.

12. The converter according to claim 11, wherein said liquid I is absorbant of infrared radiation in the spectral band of 8–12 or 3–5 microns.

13. The converter according to claim 6 or 11, wherein said liquid I is selected from the group consisting of substituted polysiloxanes, silicone oils, acetic acid, methanol, phenylacetic acid, butyric acid, diphenylamine, propionic acid, p-nitrochlorobenzene, acetic anhydride, acetonitrile, camphor, formic acid, cyclopentane, methylcyclopentane, cyclohexane, methylcyclohexane and wherein liquid II is selected from the group consisting ofmonobromonaphtalene, carbon tetrachloride, carbon sulfide and methylene iodide.

14. The converter according to claim 11, said interface being totally reflective, further comprising a prism supporting said liquids defining said liquid-liquid interface, the refractive index of said liquid II being greater than and substantially different from that of said liquid I and equal to or substantially equal to that of said prism.

15. The converter according to claim 14 wherein said viewing means comprises a screen arranged directly at a face of said prism from which said reflected beam emerges.

16. The converter according to claim 11, said interface being partially reflective or transmissive, wherein said indices of refraction of said liquid I and said liquid II are different from each other.

17. The converter according to claim 6, wherein said means for illuminating comprises a source of visible light whereby said converter converts said thermal image into a visible image.

18. The converter according to claim 17, said source of visible light being a source monochromatic or polychromatic, coherent or incoherent light.

19. The converter according to claim 6, wherein said viewing means comprises a screen.

20. The converter according to claim 19, wherein said screen is placed in the vicinity of said liquid-liquid interface.

21. The converter according to claim 6, wherein said viewing means comprises a detecting system.

22. The converter according to claim 6, wherein said means for illuminating comprises a source of visible light.

23. The converter according to claim 6, wherein said viewing means provides a measurement of surface temperature gradients of the object emitting thermal radiation.

24. The converter according to claim 6, wherein said infrared optical system comprises a lens system.

25. A thermal image converter for viewing an object emitting infrared radiation, the converter comprising means for receiving infrared radiation emitted by the object being viewed, said means comprising an infrared radiation sensitive target, means for illuminating the infrared radiation sensitive target, means for processing and/or making visible the light rays emerging from the target, the converter being characterized in that the sensitive target comprises a first container containing two liquids partially miscible at operating temperature and pressure forming a low-surface-tension, active liquid-liquid interface, one side of the first container facing the object being transmissive of infrared radiation, a second container containing a compensating liquid-liquid interface which is substantially parallel to the active interface, whereby infrared radiation emitted by the object is focused on the less dense liquid in the first container, the means for illuminating providing a beam of parallel light rays illuminating the active interface, the angle of incidence of the rays on the active interface being chosen so as to provide substantially total reflection, rays reflected by the active interface then being reflected by the compensating interface and forming a beam of rays capable of being viewed in the means for processing and the parallel light beam illuminating the target traversing it without any substantial change in direction irrespective of the spatial position of the converter.

26. The converter according to claim 25, wherein said target essentially comprises two containers disposed on parallel faces of a glass rhombohedron, the first container comprising the active interface sensitive to infrared radiation, the side of the first container opposite the rhombohedron and facing the object having a germanium or the like window transparent to infrared radiation, an inert gas such as nitrogen being contained in the free space in the first container between the liquid layer and the window, the second container essentially containing a mercury layer and a liquid whose refractive index is substantially identical with that of the glass of the rhomdohedron, the last mentioned liquid being disposed between the layer of mercury and the adjacent face of the rhombohedron.

27. The converter according to claim 26 wherein the free faces of the rhombohedron are perpendicular to the central rays of the light beam illuminating the target.

28. The converter according to claim 27 wherein the angle of reflection of the light beam on the active interface is advantageously 60°.

29. The converter according to claim 25 wherein the means for receiving the infrared radiation comprise, in the direction of the radiation, a lens system and a diaphragm, e.g. an iris diaphragm, for focusing the radiation on the less dense liquid contained in the first container of the target.

30. The converter according to claim 25 wherein the means for illuminating the target comprise a collimator including a light source emitting visible light, a condenser, a diaphragm, and a lens system thereby providing a beam of parallel light rays.

31. The converter according to claim 25 wherein the means for processing and viewing the light rays emerging from the target comprises an afocal system with two cylindrical lenses, a Porro prism, a ground glass plate, and a bi-ocular lens.

* * * * *

UNITED STATES PATENT AND TRADEMARK OFFICE
CERTIFICATE OF CORRECTION

PATENT NO. : 4,275,302
DATED : 6-23-81
INVENTOR(S) : Christian Imbert et al

It is certified that error appears in the above-identified patent and that said Letters Patent are hereby corrected as shown below:

Column 1, line 32, change "holometer" to --bolometer--.

Column 4, line 17, change "whith" to --with--.

Column 4, line 25, change "the" to --The--.

Column 4, line 29, change "used" to --use--.

Column 14, line 61, change "manually" to --mutually--.

Signed and Sealed this

Seventeenth Day of November 1981

[SEAL]

Attest:

GERALD J. MOSSINGHOFF

Attesting Officer   Commissioner of Patents and Trademarks